United States Patent
Greywall et al.

(10) Patent No.: US 7,399,443 B2
(45) Date of Patent: Jul. 15, 2008

(54) CARBON PARTICLE FIBER ASSEMBLY TECHNIQUE

(75) Inventors: Dennis S Greywall, Whitehouse Station, NJ (US); Bernard Yurke, Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 447 days.

(21) Appl. No.: 10/789,154

(22) Filed: Feb. 27, 2004

(65) Prior Publication Data

US 2005/0189671 A1    Sep. 1, 2005

(51) Int. Cl.
*B29C 35/08* (2006.01)
*D02G 1/02* (2006.01)

(52) U.S. Cl. ........... 264/494; 264/640; 264/641; 264/656; 264/657; 264/103; 264/108; 264/171.13; 264/236

(58) Field of Classification Search ............ 264/172.11, 264/211.12, 347, 13, 176.1, 210.5, 29.2, 264/621, 349, 464, 209.6, 108, 103, 640–641, 264/656–657, 236, 494, 171.13; 425/391; 423/447.1; 524/496; 428/364
See application file for complete search history.

(56) References Cited

U.S. PATENT DOCUMENTS

| | | | | |
|---|---|---|---|---|
| 4,289,716 | A * | 9/1981 | Voigt | 264/45.9 |
| 5,643,990 | A * | 7/1997 | Uehara et al. | 524/496 |
| 6,106,745 | A * | 8/2000 | Krins et al. | 264/1.27 |
| 6,299,812 | B1 * | 10/2001 | Newman et al. | 264/176.1 |
| 6,331,265 | B1 * | 12/2001 | Dupire et al. | 264/286.3 |
| 6,682,677 | B2 * | 1/2004 | Lobovsky et al. | 264/172.11 |
| 2001/0052656 | A1 * | 12/2001 | Newman et al. | 264/176.1 |
| 2002/0113335 | A1 * | 8/2002 | Lobovsky et al. | 264/184 |
| 2002/0159943 | A1 * | 10/2002 | Smalley et al. | 423/447.1 |
| 2003/0236588 | A1 * | 12/2003 | Jang et al. | 700/119 |
| 2004/0096389 | A1 * | 5/2004 | Lobovsky et al. | 423/447.1 |

(Continued)

FOREIGN PATENT DOCUMENTS

GB    1 174 959 A    12/1969

(Continued)

OTHER PUBLICATIONS

U.S. Appl. No. 10/789,074, filed Feb. 27, 2004, Greywall.

(Continued)

*Primary Examiner*—Suzanne E. McDowell
(74) *Attorney, Agent, or Firm*—Eugene J. Rosenthal

(57) ABSTRACT

Carbon particles, such as, carbon fibrils and carbon nanotube molecules, may be assembled into substantially pure aligned fibers by a) dispersing the carbon particles within a curable liquid, b) aligning the carbon particles by flowing the mixture of curable liquid and carbon particles down a tapering tube, and c) curing the flowing mixture of curable liquid and carbon particles in the general vicinity of the end of the tapering tube to form a fiber. The curable liquid may be cured using ultraviolet light. The solidified mixture may be further processed by d) heating the fiber so as to cause the volatile elements of the solidified curable liquid portion to substantially dissipate from the fiber, e) twisting the fiber to increase its density, f) heating the fiber to sinter the carbon particles within the fiber, and g) cladding the fiber. The resulting fiber may then be spooled onto a take-up drum.

27 Claims, 1 Drawing Sheet

U.S. PATENT DOCUMENTS

| | | | |
|---|---|---|---|
| 2005/0054830 A1* | 3/2005 | Islam et al. | 530/353 |
| 2005/0100501 A1* | 5/2005 | Veedu et al. | 423/447.2 |
| 2005/0188727 A1* | 9/2005 | Greywall | 65/395 |
| 2005/0228110 A1* | 10/2005 | Ko et al. | 524/496 |
| 2005/0239948 A1* | 10/2005 | Haik et al. | 264/104 |
| 2005/0269726 A1* | 12/2005 | Matabayas, Jr. | 264/104 |
| 2006/0099135 A1* | 5/2006 | Yodh et al. | 423/447.1 |

FOREIGN PATENT DOCUMENTS

| | | |
|---|---|---|
| WO | WO 01/12700 A | 2/2001 |
| WO | WO 02/055769 A | 7/2002 |

OTHER PUBLICATIONS

R. Andrews et al., "Nanotube Composite Carbon Fibers", *Applied Physics Letters*, American Institute of Physics, New York, US, vol. 75, No. 9, Aug. 30, 1999, pp. 1329-1331.

* cited by examiner

CARBON PARTICLE FIBER ASSEMBLY TECHNIQUE

TECHNICAL FIELD

This invention relates to carbon particles such as carbon nanotube molecules and carbon fibrils, and more particularly, to the art of assembling carbon particles into fibers in which the carbon particles are aligned.

BACKGROUND OF THE INVENTION

Carbon particles, such as carbon nanotube molecules and carbon fibrils, have an array of properties, including electrical, mechanical, and heat conducting properties, that are highly desirable. However, the particles are relatively short, e.g., the longest ones are on the order of a few microns. Unfortunately, such lengths are generally unsuitable for applications in which the properties of the carbon particles can prove beneficial.

In concurrently filed application, U.S. patent application Ser. No. (case Greywall 34), which is incorporated by reference as if fully that carbon particles, such as, carbon fibrils and carbon nanotube molecules, may be assembled into aligned fibers using processes derived from the processes used to manufacture optical fiber. More particularly, the carbon particles are embedded in glass, which is then drawn to align them. By aligned it is meant that the axis along the longest dimension of each of the various particles in a local vicinity are substantially parallel.

A resulting fiber typically retains a certain amount of glass content. Such glass content may enhance the strength of the fiber. Nevertheless, it may be desirable to eliminate or substantially reduce the fiber's glass content, e.g., to achieve greater elasticity. This is often referred to in the literature as "strength" versus "toughness". Furthermore, the length of fiber that may be produced is limited by the size of the initial body from which the fiber is drawn. Additionally, it would be desirable to be able to form fibers at room temperatures using as simple a process as possible.

SUMMARY OF THE INVENTION

We have recognized that, in accordance with the principles of the invention, that carbon particles, such as, carbon fibrils and carbon nanotube molecules, may be assembled into substantially pure aligned fibers by a) dispersing the carbon particles within a curable liquid, b) aligning the carbon particles by flowing the mixture of curable liquid and carbon particles down a tapering tube, and c) curing the flowing mixture of curable liquid and carbon particles in the general vicinity of the end of the tapering tube to form a fiber. In one embodiment of the invention, the curable liquid is cured, at least in part, through the use of ultraviolet light.

Depending upon the desired final properties of the fiber, various optional steps may be employed, either individually or in combination, to further process the solidified mixture. Such optional steps include d) heating the fiber so as to cause the volatile elements of the solidified curable liquid portion to substantially dissipate from the fiber, e) twisting the fiber to increase its density, f) heating the fiber to sinter the carbon particles within the fiber, and g) cladding the fiber. The order for performing any of the optional steps is dependent upon the desired properties for the fiber being made. The resulting fiber may then be spooled onto a take-up drum.

In one embodiment of the invention, the curing step may be performed, at least in part, while the mixture of carbon particles and curable liquid is still within the tapering tube. For example, if the curable liquid is cured in the presence of ultraviolet light, the tapering tube may have at least a section that passes a sufficient amount of ultraviolet light so as to cure the mixture the desired amount. In another embodiment of the invention, the curing step is performed only after the carbon particles within the curable liquid exit from the tapering tube.

In another embodiment of the invention, the carbon particles are either carbon fibrils or carbon nanotube molecules.

In yet a further embodiment of the invention, both carbon fibrils and carbon nanotube molecules are employed to make up a single fiber.

DETAILED DESCRIPTION

Figure 1:
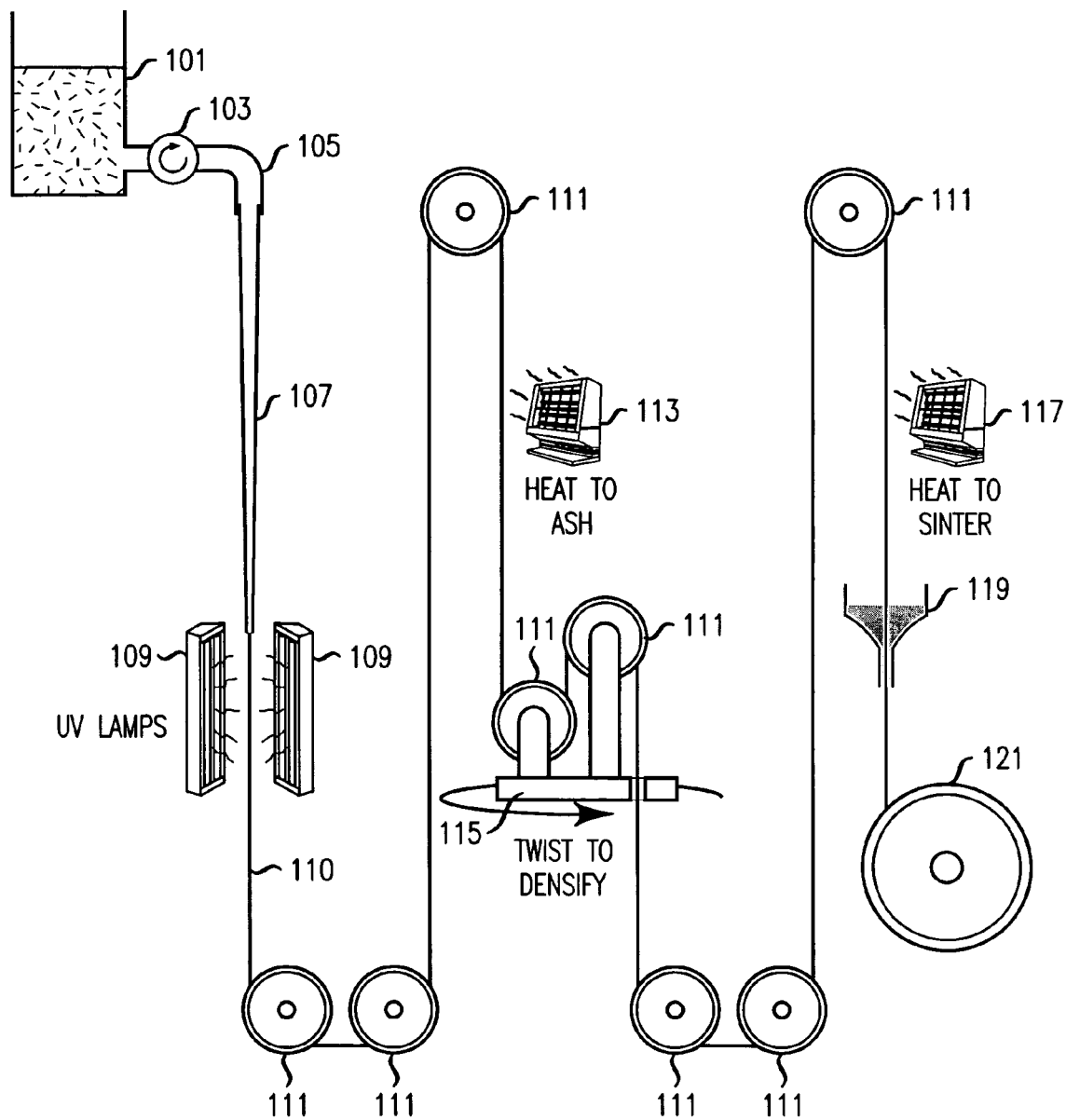
FIG. 1 shows a graphical representation of an exemplary process, in accordance with the principles of the invention, for assembling carbon particles, such as, carbon fibrils and carbon nanotube molecules, into aligned fibers.

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views embodying the principles of the invention. Similarly, it will be appreciated that any flow charts, flow diagrams, state transition diagrams, pseudocode, and the like represent various processes which may be, but need not be, substantially represented in computer readable medium and so executed by a computer or processor, whether or not such computer or processor is explicitly shown.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as any mechanical elements coupled to software controlled circuitry. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows a graphical representation of an exemplary process, in accordance with the principles of the invention, for assembling carbon particles, such as, carbon fibrils and carbon nanotube molecules, into aligned fibers. By aligned it is meant that the axis along the longest dimension of each of the various particles in a local vicinity are substantially parallel.

Shown in FIG. 1 are a) beaker 101, b) pump 103, c) supply outlet 105, d) tapering tube 107, e) ultraviolet curing lamp 109, f) pulleys 111, g) heater 113, h) twisting platform 115, i) heater 117, j) cladding applicator 119, and k) take-up drum 121.

The carbon particles, e.g., carbon nanotube molecules, carbon fibrils, or a combination thereof, are dispersed within an ultraviolet curable liquid contained in beaker 101. In one embodiment of the invention, the curable liquid is cured, at least in part, through the use of ultraviolet light. In an exemplary embodiment of the invention, the ultraviolet curable liquid is a copolymer of methylmethacrylate (95%) with the ester (5%) of methacrylic acid and anthaceyl methanol. Such an ultraviolet curable liquid cures in the presence of ultraviolet light, e.g., 350 nm light. The polymer can be diluted with the solvent toluene to control its flow properties. In another embodiment of the invention, the ultraviolet curable liquid may be PS2067 which is commercially available from United Chemical Technologies.

Pump 103 pumps the mixture of the carbon particles dispersed within the curable liquid from beaker 101 into tapering tube 107 via supply outlet 105. By flowing through tapering tube 107 the carbon particles are caused to align. Note that tapering tube 107 need not be a single unitary piece but may be made in sections and the sections may be made of different materials. Various properties of tapering tube 107, such as its length, orifice sizes, and taper rate affect the degree of alignment of the carbon particles, and hence the final properties of the resulting fiber. In one embodiment of the invention, the flow tube is a 20 cm length of quartz tubing with an inlet diameter of 5 mm and an outlet diameter of 100 microns. Similarly, the concentration of the carbon particles within the curable liquid and flow velocity, also affect the degree of alignment of the carbon particles, and hence the final properties of the resulting fiber.

In one embodiment of the invention, the flowing mixture of curable liquid is cured by shining thereon ultraviolet light from ultraviolet curing lam 109 in the general vicinity of the end of the tapering tube, thereby forming a fiber. For example, ultraviolet curing lamp 109 may be a 500 W high-pressure ultraviolet lamp giving off 350 nm light. The curing step may be performed, at least in part, while the flowing mixture of ultraviolet curable liquid is still in tapering tube 107. To this end, tapering tube 107 may have at least a section that passes a sufficient amount of ultraviolet light to permit same curing. For example, a portion of tapering tube 107 may be mad of amorphous quartz which is ultraviolet transparent. In another embodiment of the invention, the curing is performed only after the flowing mixture of ultraviolet curable liquid exits from tapering tube 107. Those of ordinary skill in the art will readily recognize that liquids curable at least in part through the application of factors other than ultraviolet light may, alternatively or additionally, be employed. Means for applying such other factors may be substituted for, or supplement, ultraviolet curing lamp 109.

After exiting tapering tube 107 and being cured, resulting fiber 110 may continue to travel, e.g., from its momentum or due to the force of gravity. Additional optional processing of the fiber may be undertaken.

For example, the fiber may be routed around pulleys 111 and directed toward heater 113, which heats the fiber so as to cause the volatile elements of the solidified curable liquid portion to substantially dissipate from the fiber. At this point, the fiber is substantially made up of only carbon.

Additional pulleys 111 mounted on twisting platform may be employed to twist the fiber to increase its density.

The fiber may then be routed past optional heater 117, which heats the fiber to sinter the carbon particles within the fiber. It may be advantageous to sinter the fiber after twisting, because twisting causes the carbon particles with in the fiber to be closer together.

Cladding applicator 119 may coat the fiber with an optional cladding. For example, it may be advantageous to coat the fiber with a nonconducting cladding for use in electrical applications. On the other hand, for use in applications such as bullet-proof vests, no cladding may be desired.

Note that the when present, the order of any heating, twisting, sintering, and cladding is at the discretion of the implementor and is only dependent upon the desired properties for the fiber being made. The final fiber may then be spooled onto take-up drum 121.

Advantageously, aligned carbon particle fibers are produced which are substantially free of any noncarbon impurities.

What is claimed is:

1. A method for assembling carbon particles into at least one fiber, the method comprising the steps of:

aligning said carbon particles by flowing a mixture of said carbon particles and a curable liquid down a tapering tube starting at a first end of said tapering tube;

curing said flowing mixture at least near a second end of said tapering tube whereby a fiber is formed, wherein said fiber comprises said carbon particles and a solidified portion of said curable liquid; and heating said fiber so as to cause volatile elements of the solidified portion to substantially dissipate from the fiber.

2. The invention as defined in claim 1 further comprising the step of dispersing said carbon particles within said curable liquid to form said mixture.

3. The invention as defined in claim 1 wherein said curable liquid cures, at least in part, in the presence of ultraviolet light.

4. The invention as defined in claim 1 further comprising the step of twisting said fiber.

5. The invention as defined in claim 1 further comprising the step of increasing the density of said fiber.

6. The invention as defined in claim 1 comprising the step of sintering at least some of said carbon particles within said fiber.

7. The invention as defined in claim 1 comprising the step of cladding said fiber.

8. The invention as defined in claim 1 comprising the step of spooling said fiber onto a take-up drum.

9. The invention as defined in claim 1 wherein said curable liquid comprises at least one of the group consisting of:
   (i) a copolymer of (a) methylmethacrylate with (b) the ester of methacrylic acid and anthaceyl methanol; and
   (ii) PS2067.

10. The invention as defined in claim 1 wherein carbon particles comprise at least carbon nanotube molecules.

11. The invention as defined in claim 1 wherein carbon particles comprise at least carbon fibrils.

12. The invention as defined in claim 1 wherein said curing step is performed, at least in part, by shining ultraviolet light upon said mixture.

13. The invention as defined in claim 1 wherein said curing is performed at least in part while said mixture remains within said tapering tube.

14. The invention as defined in claim 1 wherein said tapering tube has a portion that is at least partially translucent to ultraviolet light.

15. The invention as defined in claim 1 wherein said curing is performed at least in part after said mixture has exited from said tapering tube.

16. The invention as defined in claim 1, wherein the step of heating said fiber comprises substantially removing the solidified portion so that said fiber consists essentially of said carbon particles.

17. A method for assembling carbon particles into at least one aligned fiber, the method comprising the steps of:
    passing a curable liquid containing carbon particles through a tapering tube, whereby said carbon particles become substantially aligned;
    curing said passing liquid near an end of said tapering tube whereby a fiber is formed, wherein said fiber comprises said carbon particles and a solidified portion of said curable liquid; and
    heating said fiber so as to cause volatile elements of the solidified portion to substantially dissipate from the fiber.

18. The invention as defined in claim 17 wherein said carbon particles are carbon nanotube molecules.

19. The invention as defined in claim 17 wherein said carbon particles are carbon fibrils.

20. The invention as defined in claim 17, wherein the step of heating comprises substantially removing the solidified portion so that said fiber consists essentially of said carbon particles.

21. The invention as defined in claim 17, wherein said curable liquid comprises at least one of the group consisting of:
    (i) a copolymer of (a) methylmethacrylate with (b) the ester of methacrylic acid and anthaceyl methanol; and
    (ii) PS2067.

22. A method for assembling carbon particles into at least one fiber, the method comprising the steps of:
    aligning said carbon particles by flowing a mixture of said carbon particles and a curable liquid down a tapering tube starting at a first end of said tapering tube;
    curing said flowing mixture at least near a second end of said tapering tube using ultraviolet light whereby a fiber is formed;
    heating said fiber so as to cause any volatile elements from said solidified curable liquid to substantially dissipate from said fiber;
    twisting said fiber to increase its density; and
    heating said fiber to sinter said carbon particles within said fiber.

23. The invention as defined in claim 22 further comprising the step of cladding said fiber.

24. The invention as defined in claim 22 wherein said carbon particles are carbon nanotube molecules.

25. The invention as defined in claim 22 wherein said carbon particles are carbon fibrils.

26. The invention as defined in claim 22, wherein the step of heating said fiber so as to cause comprises substantially removing the solidified curable liquid so that said fiber consists essentially of said carbon particles.

27. The invention as defined in claim 22, wherein said curable liquid comprises at least one of the group consisting of:
    (i) a copolymer of (a) methylmethacrylate with (b) the ester of methacrylic acid and anthaceyl methanol; and
    (ii) PS2067.

* * * * *